US011146580B2

(12) United States Patent
Boros et al.

(10) Patent No.: US 11,146,580 B2
(45) Date of Patent: Oct. 12, 2021

(54) SCRIPT AND COMMAND LINE EXPLOITATION DETECTION

(71) Applicant: Adobe Inc., San Jose, CA (US)

(72) Inventors: Tiberiu Boros, Bucharest (RO); Ruxandra Maria Burticǎ, Bucharest (RO); Andrei Cotaie, Ilfov (RO)

(73) Assignee: Adobe Inc., San Jose, CA (US)

( * ) Notice: Subject to any disclaimer, the term of this patent is extended or adjusted under 35 U.S.C. 154(b) by 533 days.

(21) Appl. No.: 16/146,015

(22) Filed: Sep. 28, 2018

(65) Prior Publication Data

US 2020/0106789 A1    Apr. 2, 2020

(51) Int. Cl.
| H04L 29/06 | (2006.01) |
| G06N 3/08 | (2006.01) |
| G06N 20/00 | (2019.01) |
| G06K 9/62 | (2006.01) |

(52) U.S. Cl.
CPC ........ H04L 63/1425 (2013.01); G06K 9/6223 (2013.01); G06N 3/088 (2013.01); G06N 20/00 (2019.01); H04L 63/1416 (2013.01)

(58) Field of Classification Search
CPC . H04L 63/1425; H04L 63/1416; G06N 20/00; G06N 3/088; G06K 9/6223
See application file for complete search history.

(56) References Cited

U.S. PATENT DOCUMENTS

| 8,296,257 B1 * | 10/2012 | Chavira | G06F 16/358 706/62 |
| 8,555,385 B1 * | 10/2013 | Bhatkar | G06F 21/556 726/22 |
| 8,850,571 B2 * | 9/2014 | Staniford | G06F 9/45533 726/22 |

(Continued)

OTHER PUBLICATIONS

D. Wael, A. Shosha and S. G. Sayed, "Malicious VBScript detection algorithm based on data-mining techniques," 2017 Intl Conf on Advanced Control Circuits Systems (ACCS) Systems & 2017 Intl Conf on New Paradigms in Electronics & Information Technology (PEIT), 2017, pp. 112-116 (Year: 2017).*

(Continued)

*Primary Examiner* — Robert B Leung
*Assistant Examiner* — Sameera Wickramasuriya
(74) *Attorney, Agent, or Firm* — FIG. 1 Patents

(57) ABSTRACT

Script and command line exploitation detection is described. Initially, an exploitation detection system collects data describing scripts and command lines launched by various computing devices. The exploitation detection system clusters the scripts and command lines based on a measure of similarity, namely, Bilingual Evaluation Understudy (BLEU) score. Given the clusters and the data describing the scripts and command lines, the exploitation detection system generates encodings of the scripts and command lines for input to a machine learning model, e.g., an autoencoder. From this model, the exploitation detection system receives a measure of unlikeliness that a process corresponding to a (Continued)

given script or command line launches it. The exploitation detection system ranks the scripts and command lines according to the measure of unlikeliness. In this way, the exploitation detection system can display indications of the scripts and command lines that are most unlikely to be launched by their respective process.

20 Claims, 7 Drawing Sheets

(56) References Cited

U.S. PATENT DOCUMENTS

| | | | | |
|---|---|---|---|---|
| 9,652,616 | B1* | 5/2017 | Bhatkar | G06F 21/566 |
| 10,089,383 | B1* | 10/2018 | Mackay | G06F 16/24534 |
| | | | | 706/12 |
| 10,230,749 | B1* | 3/2019 | Rostami-Hesarsorkh | |
| | | | | G06F 21/56 |
| 10,333,924 | B2* | 6/2019 | Yang | H04L 67/02 |
| 10,565,373 | B1* | 2/2020 | Rao | G06F 21/552 |
| 2011/0184896 | A1* | 7/2011 | Guyon | G06K 9/6269 |
| | | | | 706/12 |
| 2012/0159629 | A1* | 6/2012 | Lee | H04L 63/1416 |
| | | | | 726/24 |
| 2015/0139559 | A1* | 5/2015 | Smith | G06K 9/628 |
| | | | | 382/225 |
| 2015/0242752 | A1* | 8/2015 | Da Silva Lopes | G16C 20/50 |
| | | | | 706/12 |
| 2015/0293908 | A1* | 10/2015 | Mathur | G06F 40/44 |
| | | | | 704/2 |
| 2015/0381652 | A1* | 12/2015 | Wardman | H04L 63/1416 |
| | | | | 726/23 |
| 2016/0269424 | A1* | 9/2016 | Chandola | G06F 21/552 |
| 2018/0011977 | A1* | 1/2018 | Takeda | G16H 70/40 |
| 2018/0181873 | A1* | 6/2018 | Chen | G06F 16/90335 |
| 2018/0189492 | A1* | 7/2018 | Yoshimura | G06F 21/56 |
| 2019/0147353 | A1* | 5/2019 | Beller | G06F 16/24534 |
| | | | | 706/12 |
| 2019/0259047 | A1* | 8/2019 | Bharti | G06Q 30/0201 |

OTHER PUBLICATIONS

Kumbhar, Mr Satish, et al. "Comparative study of machine learning algorithms for anomaly detection in Cloud infrastructure." International Journal on Future Revolution in Computer Science & Communication Engineering 4.4 (2018): 596-598. (Year: 2018).*

Endler, David. "Intrusion detection. Applying machine learning to Solaris audit data." Proceedings 14th Annual Computer Security Applications Conference (Cat. No. 98EX217). IEEE, 1998. (Year: 1998).*

* cited by examiner

SCRIPT AND COMMAND LINE EXPLOITATION DETECTION

BACKGROUND

Computing systems expose command-line interfaces, such as to users and system administrators (e.g., via visual display) and to applications (e.g., via an interface for handling command-line commands). By way of example, software products (e.g., applications) launch console script to perform various tasks, such as to request details about a computing system or about computing resources using 'net' and 'wmic,' for instance. The computing systems generally log these commands, such that the logs can be reviewed by users who are security experts to detect and further investigate abnormal scripts or command lines launched by the applications. When an application launches a script or command line that the application does not commonly launch, for instance, this may be an attempt by the application to exploit (e.g., maliciously) computing resources, though not always. Certainly, there are scenarios when applications may launch abnormal scripts or command lines that do not maliciously, or otherwise, exploit computing resources. Examples of these scenarios include, but are not limited to, a software upgrade, an install of a new version of an application, a software developer conducting tests on devices and platforms, and so forth. Nevertheless, based on the potential for an abnormal script or command line to exploit computing resources, security experts further investigate the abnormal scripts or command lines, e.g., to ensure that they are not exploiting computing resources.

Conventional script and command line review systems are capable of presenting lists of launched scripts and command lines for user review. However, these systems rely largely on the intuition of security experts to search through the lists for certain patterns and conduct proactive investigations by reviewing script and command line activity from a previous time period. By way of example, such an investigation may involve user review of 9 million launched scripts and command lines over the course of 3 months. Such heavy reliance on users results in errors not only in detecting scripts and command lines launched maliciously but also in simply detecting scripts and command lines that are abnormal for an application. Accordingly, conventional script and command line review systems fail to remove many opportunities at which human error can be introduced into detection of malicious scripts and command lines.

SUMMARY

To overcome these problems, script and command line exploitation detection is leveraged in a digital medium environment. Initially, an exploitation detection system collects data describing scripts and command lines launched at various computing devices. The exploitation detection system then clusters the scripts and command lines based on a measure of similarity, namely, a weighted variant of Bilingual Evaluation Understudy (BLEU) score. Given the clusters and the data describing the scripts and command lines, the exploitation detection system generates encodings of the scripts and command lines for input to a machine learning model, e.g., an autoencoder. From the autoencoder, the exploitation detection system receives a "perplexity," a measure of unlikeliness that a process corresponding to a given script or command line launches that script or command line. The exploitation detection system ranks the scripts and command lines processed according to the measure of unlikeliness. In this way, the exploitation detection system can display indications of the scripts and command lines that are most unlikely to be launched by their respective process. Such display enables a user, such as a security expert, to easily view the most abnormal scripts and command lines launched, and conduct a further investigation into whether those scrips and command lines exploit computing resources.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
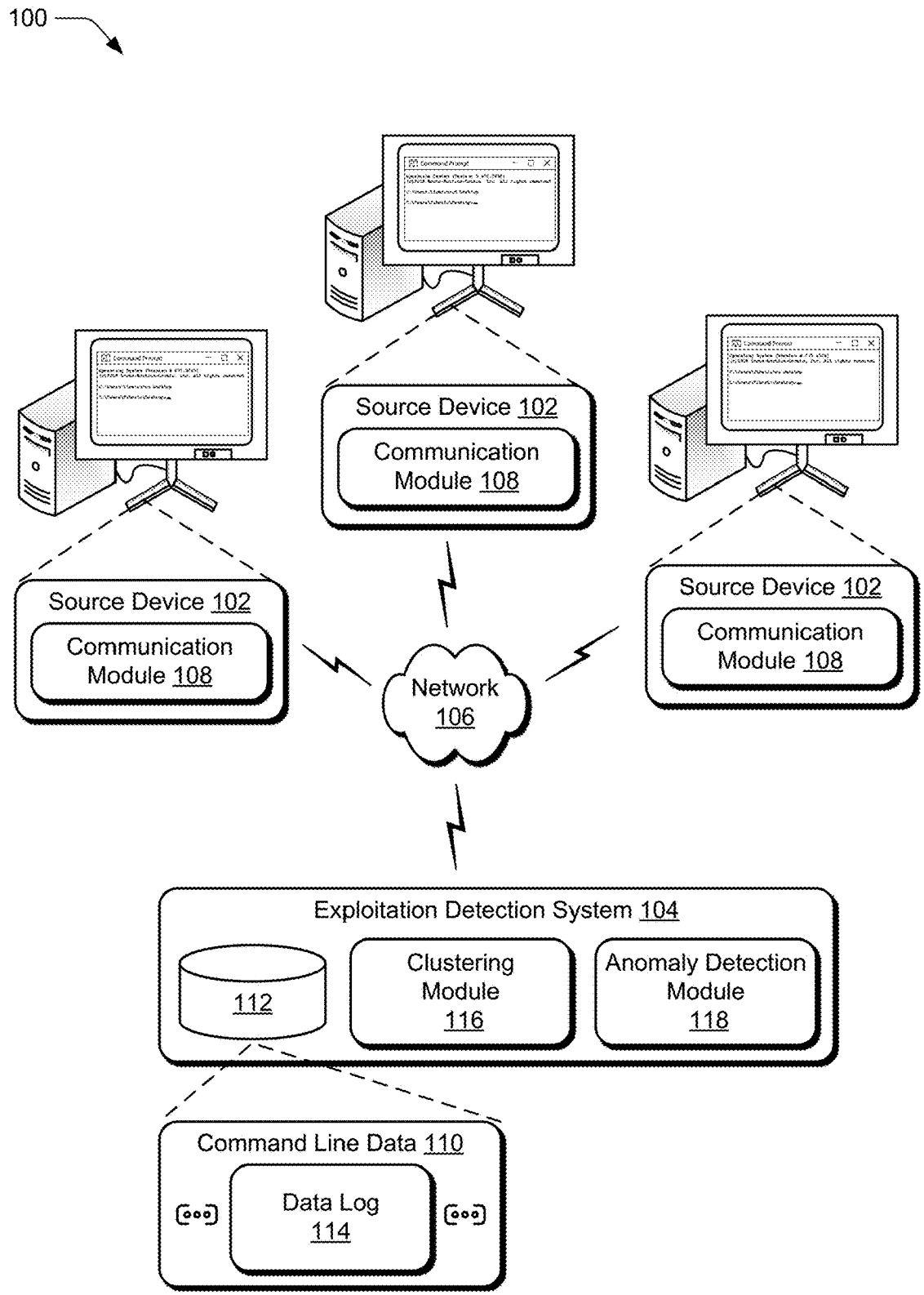
FIG. 1 is an illustration of an environment in an example implementation that is operable to employ techniques described herein.

Computing systems expose command-line interfaces, such as to users and system administrators as well as to applications. Based on the potential for an abnormal script or command line to exploit (e.g., maliciously) computing resources, security experts further investigate the abnormal scripts or command lines to ensure that they are not exploiting computing resources. Conventional script and command line review systems are capable of presenting lists of launched scripts and command lines for user review. However, these systems rely largely on the intuition of security experts to search through the lists for certain patterns and conduct proactive investigations by reviewing script and command line activity from a previous time period. Accordingly, conventional script and command line review systems fail to remove many opportunities at which human error can be introduced into detection of malicious scripts and command lines.

To overcome these problems, script and command line exploitation detection is leveraged in a digital medium environment. Initially, an exploitation detection system collects data describing scripts and command lines launched at various computing devices. By way of example, the exploitation detection system collects the data from computing devices that are associated with an enterprise. The data thus describes the scripts and command lines launched by the enterprise computing devices. In general, this data describes various aspects of the launched scripts and command lines, including, but not limited to a process that issued a given script or command line, a parent of the process that issued the given script or command line, and text corresponding to the given command line.

From this data, the exploitation detection system detects the scripts and command lines that are most unlikely to be launched by their respective process and presents indications of these most unlikely to be launched scripts and command lines. Scripts and command lines that are unlikely to be launched by a respective process may correspond to an attempt to exploit computing resources. Although there are scenarios in which abnormal scripts and command lines are not attempts to exploit computing resources, the potential for exploitation by such abnormal scripts and command lines may nevertheless compel further investigation. Accordingly, presentation of the most unlikely to be launched scripts by the engagement system aids users, such as security experts, in identifying malicious scripts and commands due simply to their presentation.

In order to detect those scripts and command lines, the exploitation detection system initially clusters the scripts and command lines. Rather than using conventional clustering techniques—that for Natural Language Processing include tokenization, TF-IDF, and k-means based on Euclidian Distance or cosine similarity—the exploitation detection system clusters the scripts and command lines using a weighted variant of Bilingual Evaluation Understudy (BLEU) score. In relation to launched scripts and command lines, and clusters of them, the BLEU score expresses a functional similarity of two scripts or command lines that share a common pattern in parameters. By using BLEU score, for example, the exploitation detection system takes advantage of the fact that scripts and command lines are text that can be expressed as n-grams of ordered parameters, e.g., such as the text string 'ping-f-t' followed by a numeric interval.

The exploitation detection system also clusters the scripts and command lines according to a bottom-up single shot clustering technique rather than according to iterative clustering techniques. In accordance with this bottom-up single shot clustering technique, the exploitation detection system determines, for each script or command line under consideration, a most similar cluster. The exploitation detection system makes this determination based on BLEU scores computed in relation to a given script or command line and any existing clusters. If the BLEU score computed in relation to the most similar cluster exceeds a pre-defined similarity threshold, the exploitation detection system simply adds the given script or command to the most similar cluster. If the BLEU score computed in relation to the most similar cluster does not exceed the pre-defined similarity threshold, however, the exploitation detection system creates a new cluster and adds the given script or command to the new cluster.

Once the scripts and command lines under consideration are clustered, the exploitation detection system generates encodings for each of the scripts and command lines. By way of example, an encoding for a given script or command line represents a process that issued the given script or command line, a parent of that process, and an identifier of the cluster to which the given script or command line is added. The exploitation detection system uses these encodings to train a machine learning model, such as an autoencoder. Once the machine learning model is trained, the exploitation detection system provides the encodings to the machine learning model as input. The exploitation system receives measures of unlikeliness from the machine learning model as output. Specifically, these measures indicate an unlikeliness that a respective process issues the script or command line. In implementations where the machine learning model is configured as an autoencoder, this measure of unlikeliness may correspond to a "perplexity" of the autoencoder. The more unlikely the process is to issue the script or command line, the more abnormal it is that the script or command line is launched, and potentially indicative of exploitation.

To this end, the exploitation detection system ranks the scripts and command lines being processed according to the measure of unlikeliness. As described in more detail below, the exploitation detection system generates a user interface to present indications of at least some of the scripts and command lines, such as the Top-X scripts and command in terms of most unlikely to be launched by a respective process. Accordingly, the described system enables a user (e.g., a security expert) to easily review the most unlikely process, parent, and script/command line combinations launched. Further, this allows such users to make determinations as to whether the corresponding launched scripts and command lines are malicious and/or exploiting computing resources. This contrasts with the reviews enabled by conventional systems in which users simply sort through multitudes (millions) of launched scripts and command lines that are organized according to some other attribute or combination of them, such as time launched, respective device, command-line parameter, and so on. In this way, the described system removes many of the opportunities in the review process at which human error can be introduced into the detection of malicious scripts and command lines.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ script and command line exploitation detection as described herein. The illustrated environment 100 includes source devices 102 and exploitation detection system 104 that are communicatively coupled, one to another, via a network 106. It is to be appreciated that although the exploitation detection system 104 is illustrated as separate from the source devices 102, the exploitation detection system 104 may additionally or alternately be included as part of any one or each of the source devices 102 without departing from the spirit or scope of the described techniques.

Computing devices that are usable to implement the source devices 102 and exploitation detection system 104 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 7.

The source devices 102 are each illustrated with a communication module 108, which represents functionality of the source devices 102 to communicate information to other devices such as service provider systems. In relation to the illustrated environment 100, the communication modules 108 represent functionality of the source devices 102 to send information to and receive information from the exploitation detection system 104. The communication modules 108, for instance, can communicate command line data 110 to the exploitation detection system 104.

The command line data 110 is illustrated in storage 112 and includes data log 114, which may correspond to one or more of the source devices 102. The command line data 110 is illustrated with ellipses to indicate that it may include multiple data logs. These multiple data logs may include a data log for each source device 102 and/or multiple data logs for a given source device 102, such as data logs received at regular intervals, e.g., weekly, daily, hourly, and so forth. Here, the command line data 110 represents data that describes scripts and command-line commands launched at the source devices 102. For instance, the command line data 110 can describe a process that launched a given script or command, a parent process of the launching process, and the script or command launched, e.g., text corresponding to the script or command.

The exploitation detection system 104 is also depicted having clustering module 116 and anomaly detection module 118. The clustering module 116 and the anomaly detection module 118 represent functionality to detect launched scripts and command lines that may attempt to exploit (e.g., maliciously) the source devices 102 and other computing resources. In particular, the clustering module 116 and the anomaly detection module 118 detect potentially exploiting scripts and command lines by processing the command line data 110. Broadly speaking, the clustering module 116 clusters similar launched command lines and similar launched scripts using clustering techniques. The anomaly detection module 118 represents functionality to measure launched scripts and command lines—in terms of unlikeliness of a process to launch a corresponding script or command given normal operating conditions—and rank the launched scripts and command lines based on the determined measurement. The exploitation detection system 104 generates user interfaces for displaying these ranked scripts and command lines to aid users (e.g., system administrators and security experts) in determining whether anomalies are malicious or not. These user interfaces drastically improve the efficiency of the review process (e.g., for malicious scripts and command lines) by significantly reducing an amount of data the users need to review, e.g., from millions of launched scripts and command lines to a smaller list of top-ranked launched scripts and command lines.

In accordance with the described techniques, the anomaly detection module 118 uses machine learning to compute these launch measurements from the command line data 110, which may be configured in a particular manner for input to a machine learning model as described in more detail below. The anomaly detection module 118 may use any type of machine-learning technique to enable detection of anomalies from the command line data 110. According to various implementations, such a machine-learning model uses supervised learning, unsupervised learning, or reinforcement learning. For example, the machine-learning model can include, but is not limited to, autoencoders, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), etc. In any case, the exploitation detection system 104 may use machine-learning techniques to continually train and update machine-learning models of the anomaly detection module 118 (or, in other words, to update a trained machine-learning model) to accurately detect anomalies in launched scripts and command lines.

Having considered an example environment, consider now a discussion of some example details of the techniques for script and command line exploitation detection in a digital medium environment in accordance with one or more implementations.

Script and Command Line Exploitation Detection

Figure 2:
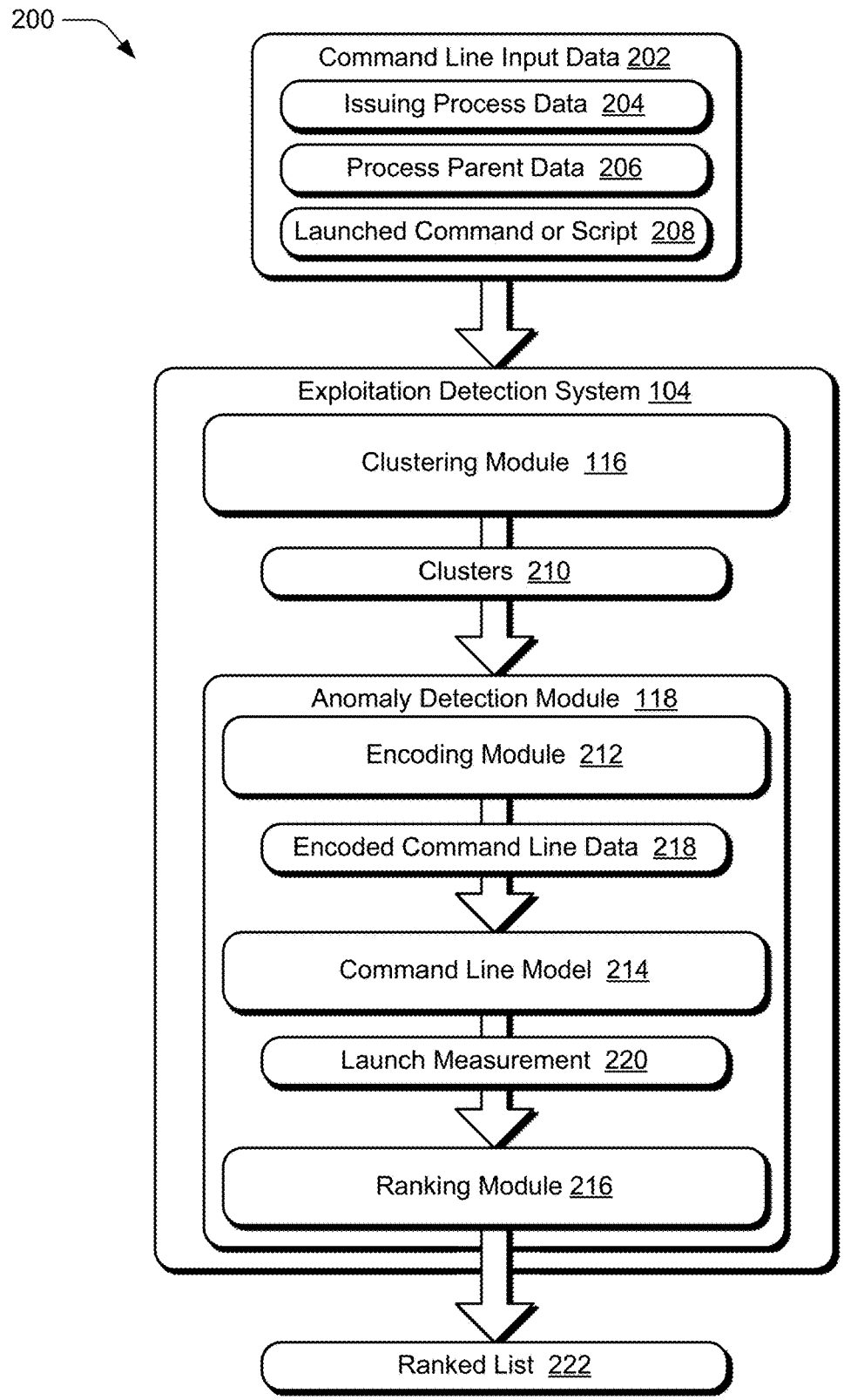
FIG. 2 depicts an example implementation in which the exploitation detection system of FIG. 1 generates a ranked list of launched scripts and command lines.

FIG. 2 depicts an example implementation 200 in which an exploitation detection system of FIG. 1 generates a ranked list of launched scripts and command lines. The illustrated example 200 includes from FIG. 1 the exploitation detection system 104 having the clustering module 116 and the anomaly detection module 118.

In this example 200, the exploitation detection system 104 is depicted obtaining command line input data 202. The command line input data 202 represents particular portions of data taken or derived from the data logs 114 of the command line data 110. Although the command line input data 202 is shown being received by the exploitation detection system 104, in one or more implementations the exploitation detection system 104 also includes functionality to process the command line data 110 to produce the command line input data 202, such as by parsing the command line data 110 and extracting the data included in the command line input data 202.

As illustrated, the command line input data 202 includes issuing process data 204, process parent data 206, and launched command or script 208. Generally speaking, the command line input data 202 represents the data that is processed by the modules of the exploitation detection system 104 for a single launched command or launched script. To this end, a different instance of the command line input data 202 may be generated for each script or command launched, e.g., the scripts and command lines recorded through inclusion in the command line data 110.

Accordingly, the issuing process data 204 describes, for a given launched script or command, the process that launched the script or command. The process parent data 206 describes a parent process of the process described by the issuing process data 204. The launched command or script 208 describes the given launched command or script. For example, the launched command or script 208 is text data corresponding to the given launched script or command, e.g., one or more text strings corresponding to the command or script, a text file corresponding to the command or script, and so forth. In accordance with the described techniques, the exploitation detection system 104 is thus configured to leverage three aspects of data about each launched script or command—the issuing process, the parent of the issuing process, and the actual script or command—to detect anomalies in an entire set of launched scripts and commands.

Using the command line input data 202, the clustering module 116 clusters the launched scripts and commands. In general, the command line data 110, processed by the exploitation detection system 104 as a plurality of instances of the command line input data 202, is a large dataset. Typical machine learning approaches often fail to process datasets of this size in production environments, where response-time is critical, due to the computational complexity required and extensive memory usage. In addition, conventional clustering techniques, based on TF-IDF, k-means, and cosine similarity, are inefficient for clustering the instances of the command line input data 202. This is due to the size and type (e.g., text data) of the dataset. When using these conventional techniques, for instance, an optimal number of clusters is unknown at the outset of clustering, and adjusting measures (e.g., silhouette and minimum description length (MDL)) as part of the clustering is computationally expensive. The clustering module 116 thus does not cluster the launched scripts and commands using these conventional techniques—the clustering module 116 clusters the launched scripts and commands without using TF-IDF, k-means, and cosine similarity. Rather, the clustering module 116 clusters the launched scripts and commands based on Bilingual Evaluation Understudy (BLEU) score to generate clusters 210.

To this end, the clustering module 116 represents functionality of the exploitation detection system 104 to compute a BLEU score for a launched script or command line given the respective command line input data 202. In general, BLEU score measures a similarity between two proposed translations of a sentence. In relation particular to the described techniques though, the clustering module 116 computes BLEU scores for the launched scripts and commands to express a functional similarity of two scripts or command lines that share a common pattern in parameters. For instance, the clustering module 116 computes a weighted variant of BLEU, which accurately captures these patterns in scripts and command lines. By using BLEU score, for example, the clustering module 116 takes advantage of the fact that scripts and command lines are text that can be expressed as n-grams of ordered parameters, e.g., such as the text string 'ping-f-t' followed by a numeric interval. This contrasts with using TF-IDF and cosine similarity, which do not take advantage of these characteristics of scripts and command lines.

Given BLEU scores, the clustering module 116 clusters the launched scripts and commands into the clusters 210. In particular, the clustering module 116 clusters based on a bottom-up single shot clustering technique. The clustering module 116 uses this bottom-up single shot clustering technique rather than using iterative clustering techniques—the clusters 210 are thus generated without using an iterative clustering technique. In the following discussion of the bottom-up single shot clustering technique, a set of clusters is represented by the term {C} and a list of launched scripts and command lines is represented by the term [L], such that C(j) represents a given cluster and L(i) represents a given script or command line from the list.

Initially, the clustering module 116 obtains a first script or command line L(0) from the list [L] and creates a new cluster C(0). The clustering module 116 processes the other scripts and command lines of the list in turn. The clustering module 116 compares data representative of each of the scripts or command lines L(i) to data representative of each cluster C(i), e.g., using BLEU scores. After comparing a given script or command line L(i) to each cluster C(i), the clustering module 116 determines whether to create a new cluster or add the given script or command line L(i) to an existing cluster. This determination is made based on a measure of similarity between the given script or command line L(i) and the cluster that is most similar to the given script or command line L(i), as indicated by BLEU score. In other words, the clustering module 116 determines a most similar cluster to the given script or command line L(i) based on the weighted BLEU scores. The clustering module 116 further makes this determination by comparing the measure of similarity to a pre-defined similarity threshold—a threshold BLEU score. If the measure of similarity is below the pre-defined similarity threshold, the clustering module 116 creates a new cluster to add to existing clusters 210, and adds the given script or command line L(i) to this new cluster. If the measure of similarity is above the pre-defined similarity threshold, though, the clustering module 116 simply adds the given script or command line L(i) to the most similar cluster. Once the clustering module 116 determines whether to create a new cluster or not, and adds the given script or command line L(i) to the determined cluster (in accordance with the comparison), the clustering module 116 updates an index indicative of which scripts and command lines are included in the different clusters 210. The clustering module 116 repeats this process for each script and command line included in the list [L], e.g., until all the scripts and command lines are processed.

After the clustering module 116 generates the clusters 210, the anomaly detection module 118 detects anomalies in the scripts and command lines. As illustrated, the anomaly detection module 118 includes encoding module 212, command line model 214, and ranking module 216, which represent functionality of the anomaly detection module 118. However, it is to be appreciated that the functionality of the anomaly detection module 118 may be implemented using different components without departing from the spirit or scope of the techniques described herein.

In this example 200, the anomaly detection module 118 receives as input the clusters 210 and a portion of the command line input data 202 for each of the scripts and command lines clustered. The encoding module 212 encodes this data, such as by generating a sparse encoding of the issuing process data 204, the parent process data 206, and the clusters 210. The encoded data generated by the encoding module 212 is illustrated as encoded command line data 218. In one or more implementations, the encoding module 212 generates a three-partite representation for each of the scripts or command lines. In such implementations, the encoding module 212 encodes for each script or command line the process described by the issuing process data 204, the parent process described by the process parent data 206, and a respective cluster of the script or command line as described by the index that is indicative of which scripts and command lines are included in the different clusters 210. In this scenario, the encoded command line data 218 corresponds to a plurality of three-partite representations that represents each of the scripts or command lines input to the exploitation detection system 104. The encoded command line data 218 may be encoded in different ways without departing from the spirit or scope of the described techniques.

The encoded command line data 218 is used to train a machine learning model, which is represented by the command line model 214. In one or more implementations, for instance, the command line model 214 is configured as an autoencoder trained using the encoded command line data 218. In such implementations, the anomaly detection module 118 leverages the command line model 214, configured as an autoencoder, as an information bottleneck.

The anomaly detection module 118 also leverages the command line model 214, configured as the autoencoder, to generate a launch measurement 220 for each of the representations of the encoded command line data 218 input to the model. In accordance with the described techniques, the launch measurement 220 generated for a representation input to the command line model 214 is a reconstruction error output by the model. Such a reconstruction error represents a "perplexity" of the command line model 214 when the model receives a respective representation as input. This perplexity is indicative of an unlikeliness of a process encoded by a given representation to launch a script or command line included in the encoded cluster. To this end, larger values of the launch measurement 220 indicate that a corresponding script or command line is less likely to be launched by the respective process than smaller values of the launch measurement 220. A high value of the launch measurement 220 is thus indicative of an anomaly—an unusual occurrence in connection with the respective process.

The ranking module 216 ranks the scripts and command lines provided to the illustrated system as input according to the launch measurements 220, such that a highest ranked script or command line corresponds to the least likely to be launched by the respective process during "normal" operation, a second highest ranked script or command line corresponds to a next least likely to be launched by its respective process, and so forth. The ranking module 216 generates ranked list 222, which is data describing this ranking. The ranked list 222 is an ordered list of the scripts and command lines provided to the system as input. Presentation of the ranked list 222 or a portion (e.g., via a display device) enables a user (e.g., a security expert) to easily review the most unlikely process, parent, and script/command line combinations launched. In the context of presenting the ranked list 222, consider FIG. 3.

Figure 3:
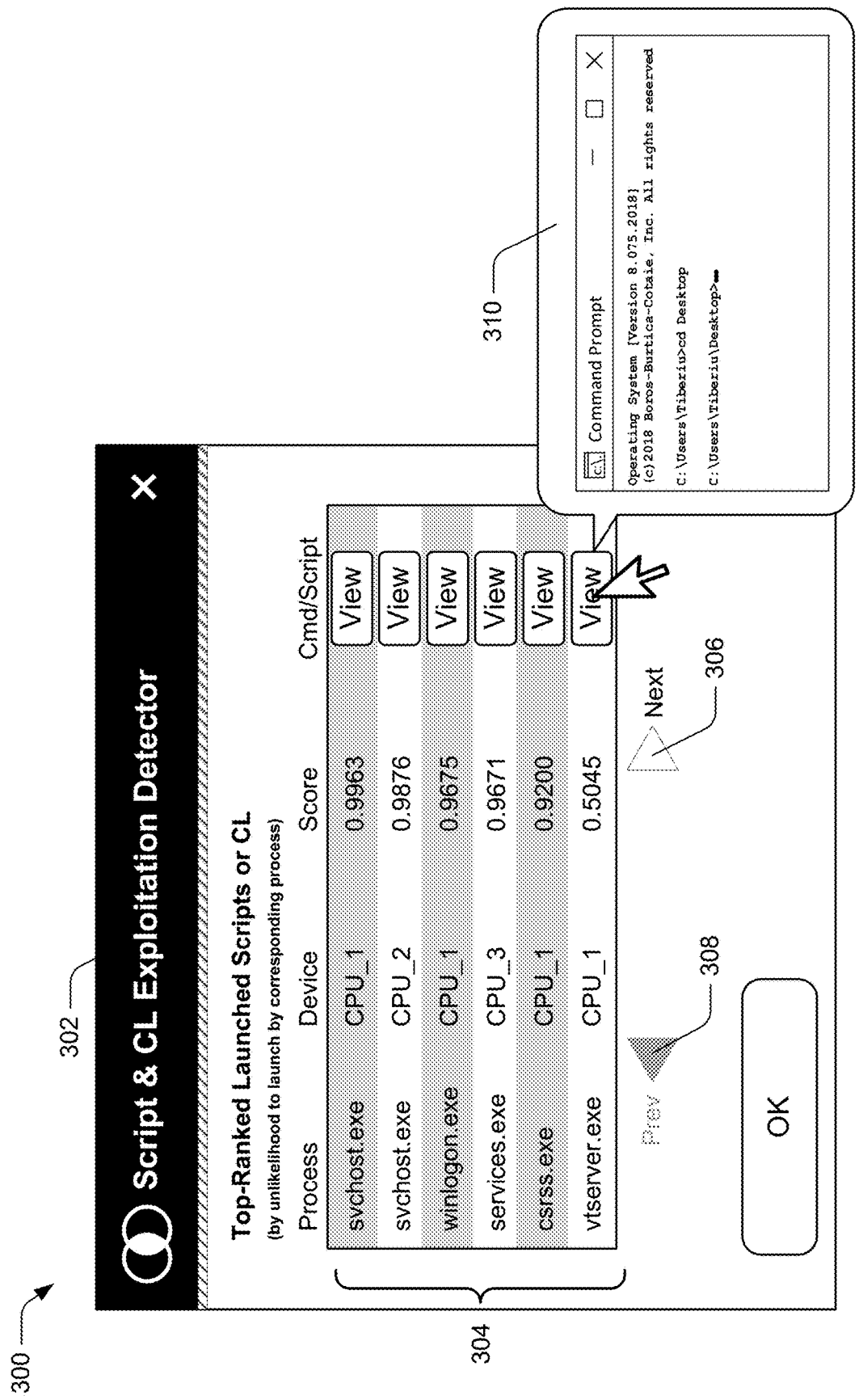
FIG. 3 depicts an example user interface via which the ranked list of launched scripts and command lines is presented.

FIG. 3 depicts an example 300 of a user interface via which the ranked list of launched scripts and command lines is presented.

The illustrated example 300 includes an exploitation detection interface 302, which is depicted as a displayable dialog box, though other configurations are contemplated within the spirit and the scope of the techniques described herein. As illustrated, the exploitation detection interface 302 includes an anomaly list 304, which includes a plurality of indications that each correspond to a launched script or command line. In one or more implementations, the anomaly list 304 as initially displayed includes indications of the top ranked scripts and command lines of the ranked list 222—the scripts and command lines least likely to be launched by their respective processes according to the launch measurement 220.

As noted above, this enables a user (e.g., a security expert) to easily review the most unlikely process, parent, and script/command line combinations launched. Further, this allows such users to make determinations as to whether the corresponding launched scripts and command lines are malicious and/or exploiting resources of a respective device. This contrasts with reviews in which users simply sort through launched scripts and command lines organized according to some other attribute or combination of them, such as time launched, respective device, command-line parameter, and so on.

The exploitation detection interface 302 also includes next instrumentality 306 and previous instrumentality 308, which represent user interface functionality that allows a user to navigate through indications corresponding to the other scripts and command lines of the ranked list 222. If the exploitation detection interface 302 is initially displayed with a top 10 most unlikely to be launched scripts and command lines, for instance, the next instrumentality 306 enables a user to select to view the next 10 most unlikely to be launched scripts and command lines. In one or more implementations, the navigation functionality represented by the next and previous instrumentalities 306, 308 enables a user to navigate through all the scripts and command lines launched, including the scripts and command lines that are likely to be launched by their respective processes.

The indications presented via the exploitation detection interface 302 may include various information associated with a respective launched script or command line. In the illustrated example 300, for instance, each of the indications in the exploitation detection interface 302 includes further indications of a process, a device, and a score, as well as an instrumentality that is selectable to output text corresponding to the respective launched script or command line. In this example, supplemental display 310 is presented to output the text corresponding to the respective launched script. Certainly, the exploitation detection interface 302 may be configured to include different information associated with the launched scripts or command lines without departing from the spirit of the described techniques. The exploitation interface 302 may also be configured in different ways to present the information, such as via a table (e.g., spreadsheet) or simply in text form (e.g., via a command line interface), in accordance with the described techniques.

The process information may correspond to the issuing process data 204 of the respective script or command line, the device information may correspond to an identifier of a respective source device 102, the score may correspond to the launch measurement 220 computed for the respective script or command line, and the instrumentality may be selectable to display text captured by the launched command or script 208 of the respective script or command line. In addition to presenting information, the exploitation detection interface 302 may be configured for more robust user interaction (not shown) without departing from the spirit or scope of the described techniques. For instance, the described systems may enable users to configure the indications presented, such as by providing input to present a top X number of indications where 'X' is user selectable, providing input to limit presentation of indications to the indications above a certain threshold score, and so forth.

Figure 4:
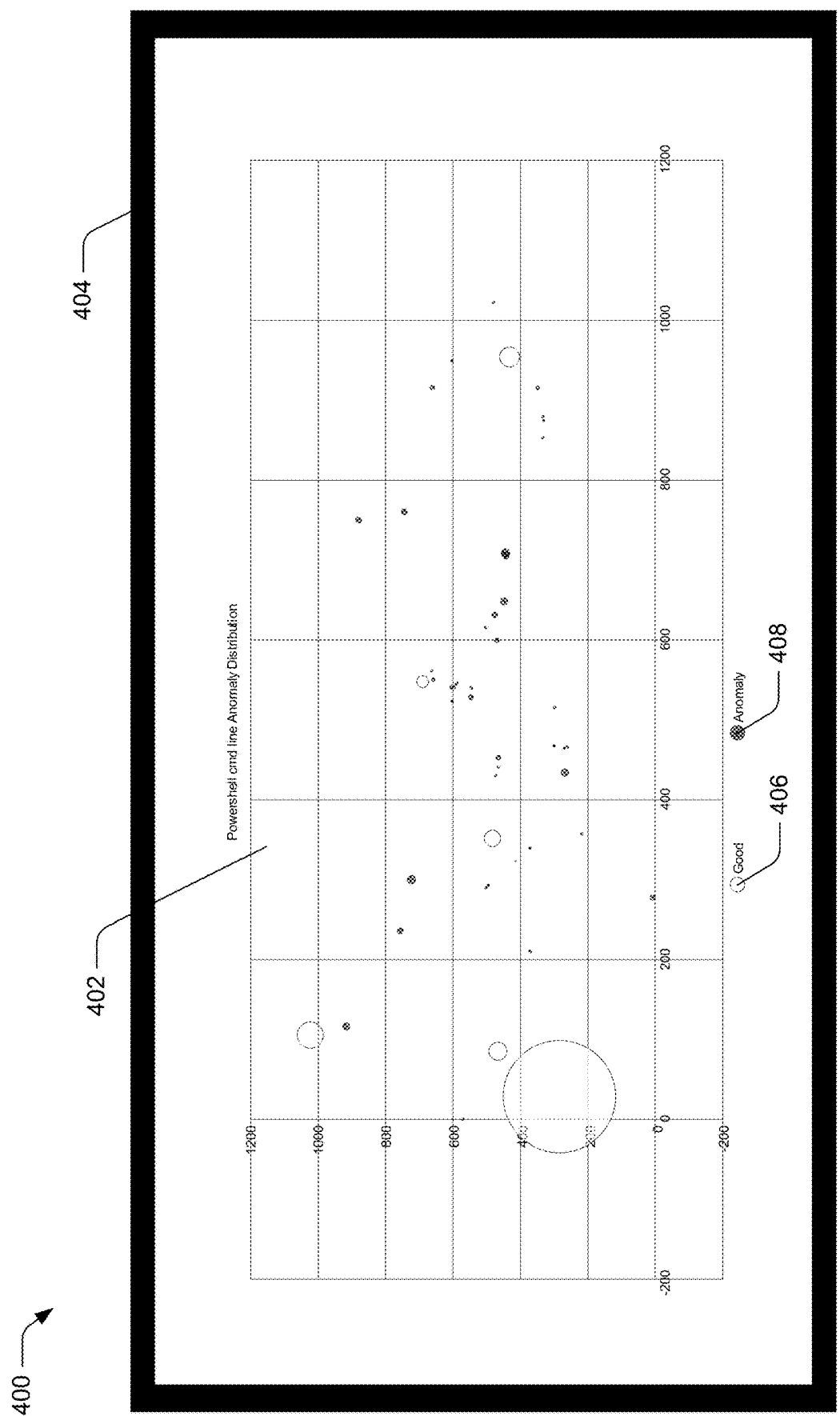
FIG. 4 depicts an example user interface via which representations of distributions of launched scripts and command lines are presented.

FIG. 4 depicts an example 400 of a user interface via which representations of distributions of launched scripts and command lines are presented.

The illustrated example 400 includes a distribution interface 402 displayed via display device 404. In this example 400, the distribution interface 402 is depicted displaying a representation of a distribution of latent representations for command lines. In one or more implementations, the exploitation detection system 104 generates this representation based on the launch measurements 220 output by the command line model 214—configured as an autoencoder. In other words, the representation may be obtained using an autoencoder applied on the encoded command line data 218.

Given a complete set of the encoded command line data 218—which may be configured as encoded input vectors—the anomaly detection module 118 initially trains the command line model 214 to reconstruct the input data. The anomaly detection module 118 then processes each instance of the encoded command line data 218 individually and, for a given instance, computes the latent representation as learned by the command line model 214. After the latent representation is computed, the anomaly detection module 118 computes a variation on each component of the latent representation, and identifies the two high variance components of the latent representation.

In accordance with the described techniques, the anomaly detection module 118 treats values of these two high variance components as two-dimensional (2D) coordinates. In one or more implementations, the anomaly detection module 118 scales the data, such as by multiplying each instance of the encoded command line data 218 (e.g., each vector) with a constant value. For instance, the anomaly detection module 118 multiplies a vector by the constant value '1024,' which may correspond to a size of a projection image. Further, the anomaly detection system 104 may round the computed values to a nearest integer and build an occurrence map, which uses a tuple comprising the rounded coordinates as a key.

Based on this, the exploitation detection system 104 renders an image by using the 2D coordinates as a center for a rendered circle. The exploitation detection system 104 also computes a radius for each of the rendered circles, e.g., by multiplying the occurrence count with a fixed constant value. In the illustrated example, the "good" circles corresponding to good-circle key 406 are larger than the "anomaly" circles corresponding to the anomaly-circle key 408. Here, the good circles are larger than the anomaly circles and thus represent high-occurring command lines. In contrast, the anomaly circles are smaller than the good circles and thus represent rare events. The white color of the good circles represents "standard" operating behavior while the black color of the anomaly circles represents possible anomalies.

Having discussed example details of the techniques for script and command line exploitation detection, consider now some example procedures to illustrate additional aspects of the techniques.

Example Procedures

This section describes example procedures for script and command line exploitation detection in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the exploitation detection system 104 of FIG. 1 that makes use of a clustering module 116 and an anomaly detection module 118.

Figure 5:
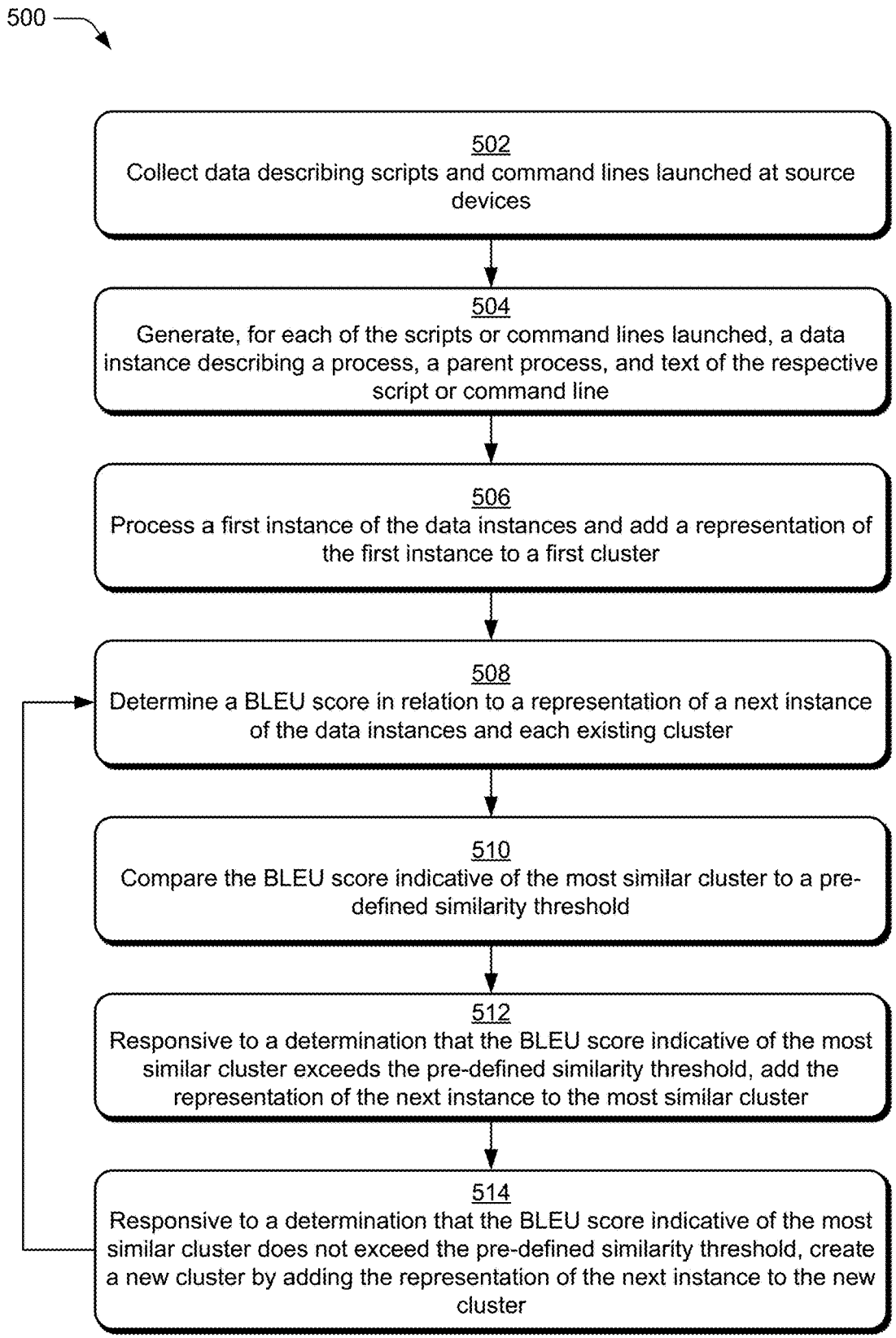
FIG. 5 depicts a procedure in an example implementation in which input command line data is clustered.

FIG. 5 depicts an example procedure 500 in which input command line data is clustered.

Initially, data describing scripts and command lines launched at source devices is collected (block 502). By way of example, the exploitation detection system 104 collects the command line data 110, such as the data logs 114, from one or more of the source devices 102.

For each of these scripts or command lines launched, a data instance is generated that describes a process, a parent process, and a text of the respective script or command line (block 504). By way of example, the exploitation detection system 104 processes the command line data 110 to produce a command line input data 202 instance for each of the launched scripts or command lines described by the command line data 110. In particular, the command line input data 202 that the exploitation detection system 104 produces includes the issuing process data 204, the process parent data 206, and the launched command or script 208.

A first instance of the data instances is processed and a representation of the first instance is added to a first cluster (block 506). By way of example, the clustering module 116 considers a first instance of the command line input data 202, creates a first cluster 210, and adds a representation of the first instance to the first cluster 210.

A BLEU score is determined in relation to a representation of a next instance of the data instances and each existing data cluster (block 508). By way of example, the clustering module 116 computes a BLEU score in relation to a representation of a next instance of the command line input data 202 and each of the clusters 210.

The BLEU score indicative of the most similar cluster is compared to a pre-defined similarity threshold (block 510). By way of example, the clustering module 116 compares the BLEU score computed at block 508 and indicative of a most similar of the clusters 210 to a pre-defined similarity threshold.

A determination is then made regarding whether the BLEU score indicative of the most similar cluster exceeds a pre-defined similarity threshold or not. Responsive to a determination that the BLEU score indicative of the most similar cluster exceeds the pre-defined similarity threshold, the representation of the next instance is added to the most similar cluster (block 512). By way of example, the clustering module 116 determines that the BLEU score indicative of the most similar cluster exceeds the pre-defined similarity threshold based on the comparison of block 510. Responsive to this, the clustering module 116 adds the representation of the next instance to an existing cluster 210.

Responsive to a determination that the BLEU score indicative of the most similar cluster does not exceed the pre-defined similarity threshold, however, a new cluster is created by adding the representation of the next instance to the new cluster (block 514). By way of example, the clustering module 116 determines that the BLEU score indicative of the most similar cluster does not exceed the pre-defined similarity threshold based on the comparison of block 510. Responsive to this, the clustering module 116 creates a new cluster 210. The clustering module 116 creates the new cluster by adding to it the representation of the next instance. Blocks 508 through 514 are performed until there are no more data instances remaining to cluster, e.g., once these steps have been performed once for each of the data instances under consideration.

Figure 6:
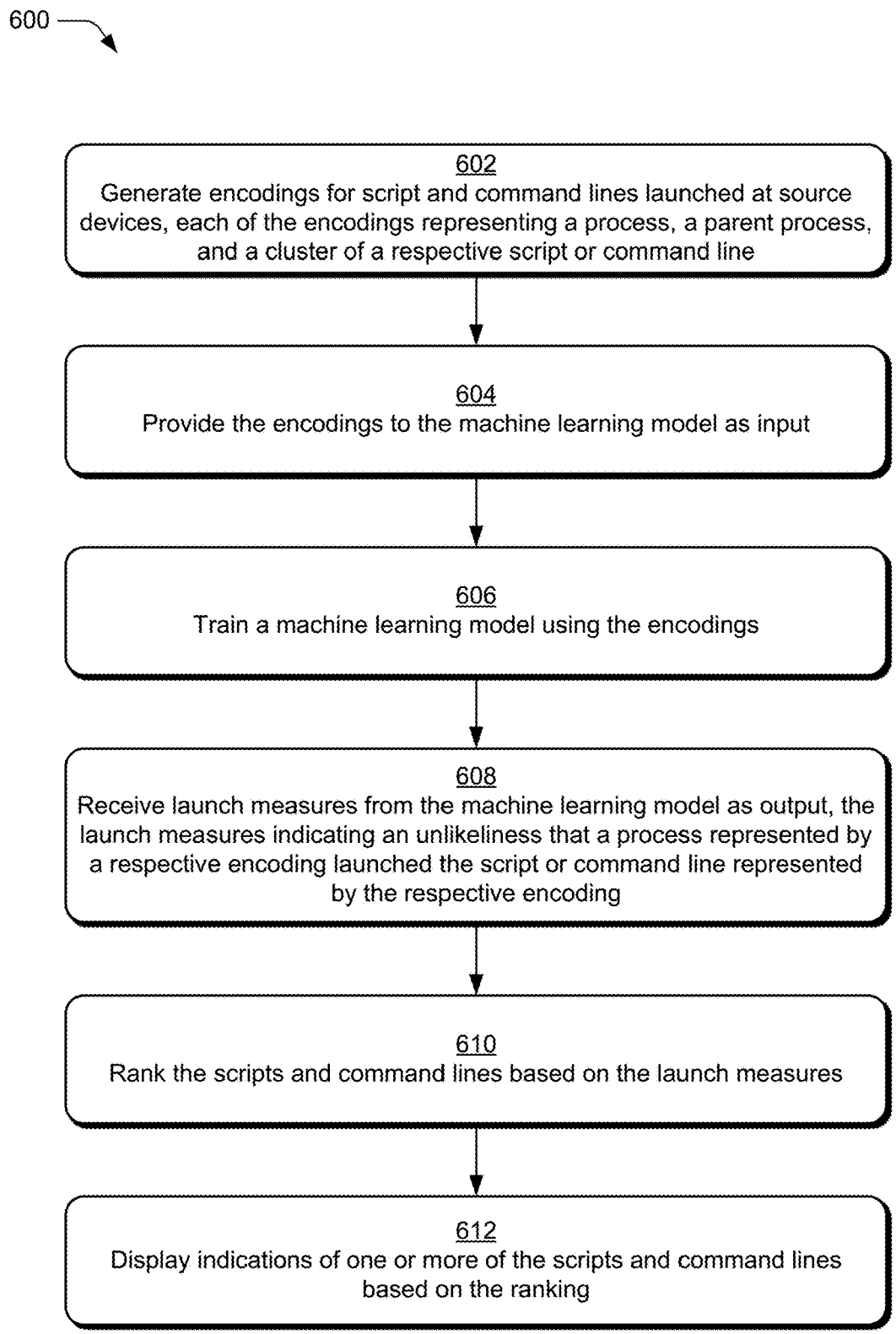
FIG. 6 depicts a procedure in which the clustered command line data and encoded representations of the command line data are used to score launched scripts and command lines.

FIG. 6 depicts an example procedure 600 in which the clustered command line data and encoded representations of the command line data are used to score launched scripts and command lines.

Encodings are generated for script and command lines launched at source devices (block 602). In accordance with the principles discussed herein, each of the encodings represents a process that issued the respective script or command line, a parent process of the issuing process, and a cluster into which the respective script or command line is clustered according to one or more clustering techniques. By way of example, the encoding module 212 generates the encoded command line data 218, which includes encodings representative of data included in the command line input data 202 (e.g., the issuing process data 204 and the process parent data 206) and data identifying a respective cluster 210.

The encodings are provided to the machine learning model as input (block 604). In order for the anomaly detection module 118 to train the command line model 214, for example, the anomaly detection module 118 provides the encoded command line data 218 as input to the command line model 214.

A machine learning model is trained using the encodings (block 606). By way of example, the anomaly detection module 118 trains the command line model 214 using the encoded command line data 218. In one or more implementations, the command line model 214 is an autoencoder so the anomaly detection module 118 trains the autoencoder using the encoded command line data 218.

Launch measures are received as output from the machine learning model (block 608). In accordance with the principles discussed herein, a launch measure indicates an unlikeliness that a process represented by a respective encoding launched the script or command line represented by the respective encoding. By way of example, the anomaly detection module 118 receives as output of the command line model 214 a launch measurement 220 for each encoding in the encoded command line data 218.

The scripts and command lines are ranked based on the launch measures (block 610). By way of example, the ranking module 216 ranks the scripts and command lines that are represented by the encodings of the encoded command line data 218 according to the launch measurements 220. Based on the ranking, the ranking module 216 generates the ranked list 222 which is a list of the scripts and command lines ordered according to the launch measurements 220.

Indications of the scripts and command lines are displayed based on the ranking (block 612). By way of example, the exploitation detection system 104 generates the exploitation detection interface 302 based on the ranking performed at block 610.

Having described example procedures in accordance with one or more implementations, consider now an example system and device that can be utilized to implement the various techniques described herein.

Example System and Device

Figure 7:
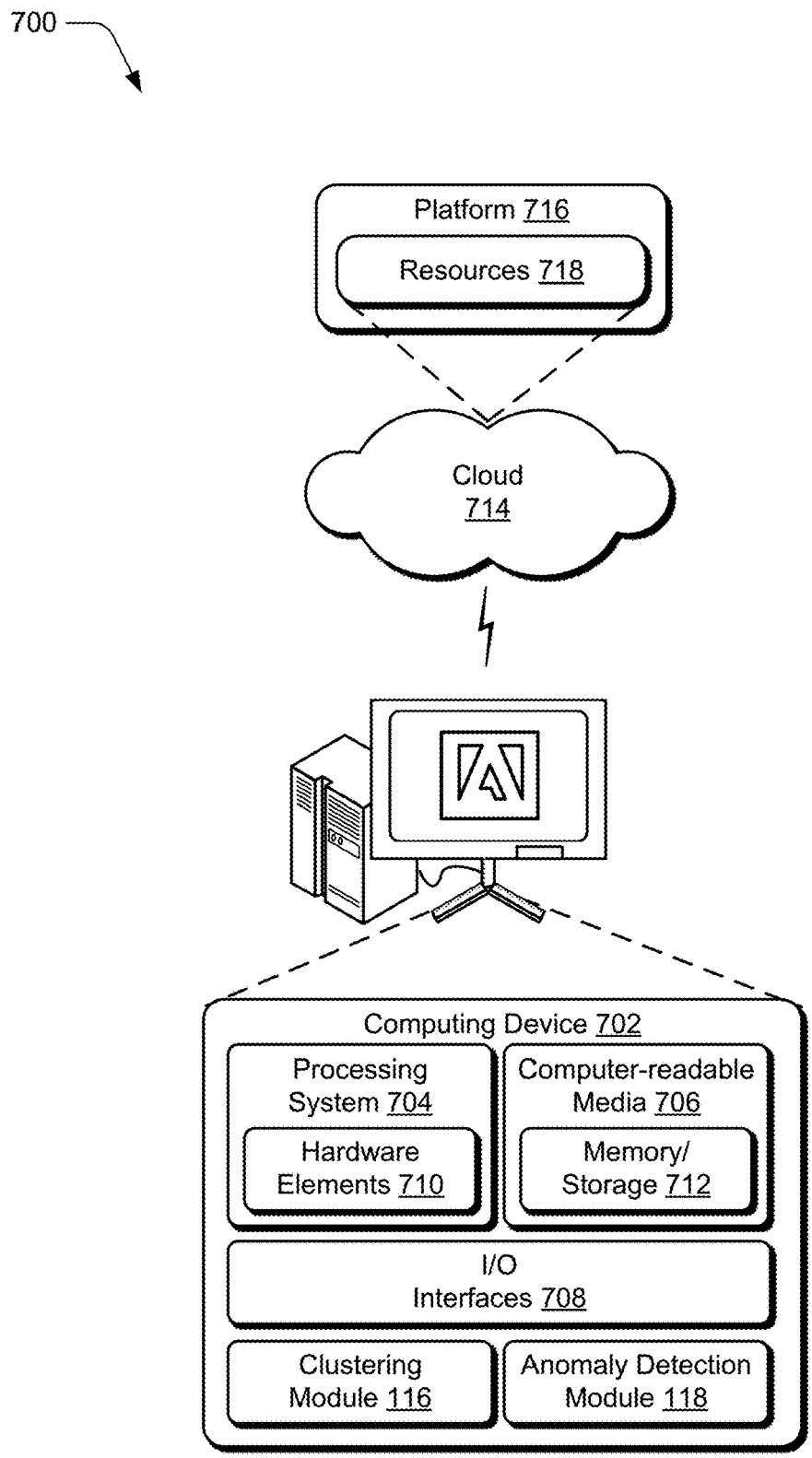
FIG. 7 illustrates an example system including various components of an example device that can be implemented as any type of computing device as described and/or utilized with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the clustering module 116 and the anomaly detection module 118. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data.

Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to enable users to determine whether scripts and commands launched by computing devices are exploiting computing resources, a method implemented by at least one computing device, the method comprising:
   collecting data describing the scripts and command lines launched;
   clustering the scripts and command lines by:
      determining measures of similarity in relation to a given script or command line and any clusters;
      determining a most similar cluster based on the measures of similarity determined in relation to the given script or command line and the clusters;
      comparing a measure of similarity of the most similar cluster to a pre-defined similarity threshold; and
      responsive to a determination that the measure of similarity exceeds the pre-defined similarity threshold, adding the given script or command line to the most similar cluster;
   generating encodings of the scripts and command lines, the encodings representing a first process, a second process, and a cluster of a respective script or command line;
   generating measures of unlikeliness that a respective first process launches the scripts and command lines, the measures generated using a machine learning model trained with the encodings to output the measures of unlikeliness;
   ranking the scripts and command lines according to the measures of unlikeliness; and
   displaying indications of at least some of the scripts and command lines based on the ranking.

2. A method as described in claim 1, wherein the measures of similarity are Bilingual Evaluation Understudy (BLEU) scores.

3. A method as described in claim 1, wherein the clustering further includes, for the given script or command line:

responsive to a determination that the measure of similarity does not exceed the pre-defined similarity threshold:
   creating a new cluster; and
   adding the given script or command line to the new cluster.

4. A method as described in claim 1, wherein the first process corresponds to a process that issued the respective script or command line.

5. A method as described in claim 4, wherein the second process corresponds to a parent process of the process that issued the respective script or command line.

6. A method as described in claim 1, wherein the encodings comprise sparse encodings of the clusters and a portion of the data describing the scripts and command lines launched.

7. A method as described in claim 1, wherein each of the encodings is a three-partite representation representative of the respective script or command line.

8. A method as described in claim 1, wherein the machine learning model is an autoencoder.

9. A method as described in claim 8, wherein a measure of the unlikeliness corresponds to a perplexity output by the autoencoder responsive to receiving a respective encoding as input.

10. A method as described in claim 1, further comprising generating a list of the scripts and command lines ordered according to the ranking.

11. A method as described in claim 10, wherein the indications comprise at least a portion of the list.

12. A method as described in claim 1, further comprising receiving user input to navigate through at least one additional indication corresponding to at least one other script or command line of the scripts and command lines.

13. A system to determine whether scripts and commands launched by computing devices are exploiting computing resources, the system comprising:
   a clustering module implemented at least partially in hardware of at least one computing device to cluster a plurality of the scripts and command lines launched by computing devices, the plurality of scripts and command lines clustered by:
      determining measures of similarity in relation to a given script or command line and any clusters;
      determining a most similar cluster based on the measures of similarity determined in relation to the given script or command line and the clusters;
      comparing a measure of similarity of the most similar cluster to a pre-defined similarity threshold; and
      responsive to a determination that the measure of similarity exceeds the pre-defined similarity threshold, adding the given script or command line to the most similar cluster;
   an anomaly detection module implemented at least partially in the hardware of the at least one computing device to:
      generate encodings of the scripts and command lines, the encodings representing a first process, a second process, and a cluster of a respective script or command line; and
      generate measures of unlikeliness that a respective first process launches the scripts and command lines, the measures generated using a machine learning model trained with the encodings to output the measures of unlikeliness.

14. A system as described in claim 13, further comprising a user interface module configured to generate a user interface that includes indications of at least some of the scripts and command lines, the user interface generated based on a ranked list of the scripts and command lines.

15. A system as described in claim 14, further comprising a ranking module implemented at least partially in the hardware of the at least one computing device configured to generate the ranked list based on the measures of unlikeliness.

16. A system as described in claim 13, wherein the measures of similarity are Bilingual Evaluation Understudy (BLEU) scores.

17. A system as described in claim 13, wherein the machine learning model is an autoencoder and the measures of unlikeliness are perplexities output by the autoencoder responsive to receiving the encodings as input.

18. A system as described in claim 13, wherein each of the encodings is a three-partite representation representative of the respective script or command line.

19. In a digital medium environment to enable users to determine whether scripts and commands launched by computing devices are exploiting computing resources, a method implemented by at least one computing device, the method comprising:
   clustering the scripts and command lines launched, the scripts and command lines clustered based on data describing a first process, a second process, and text corresponding to a respective script or command line, the scripts and command lines clustered by:
      determining measures of similarity in relation to a given script or command line and any clusters;
      determining a most similar cluster based on the measures of similarity determined in relation to the given script or command line and the clusters;
      comparing a measure of similarity of the most similar cluster to a pre-defined similarity threshold; and
      responsive to a determination that the measure of similarity exceeds the pre-defined similarity threshold, adding the given script or command line to the most similar cluster;
   generating encodings of the scripts and command lines based on the data and the clustering;
   determining measures of unlikeliness of the scripts and command lines to be launched by a respective first process by providing the encodings as input to an autoencoder; and
   displaying indications of at least some of the scripts and command lines based on the measures of unlikeliness.

20. A method as described in claim 19, wherein:
   the measures of similarity are Bilingual Evaluation Understudy (BLEU) scores;
   the first process corresponds to a process that issued the respective script or command line; and
   the second process corresponds to a parent process of the process that issued the respective script or command line.

* * * * *